United States Patent Office 3,349,821
Patented Oct. 31, 1967

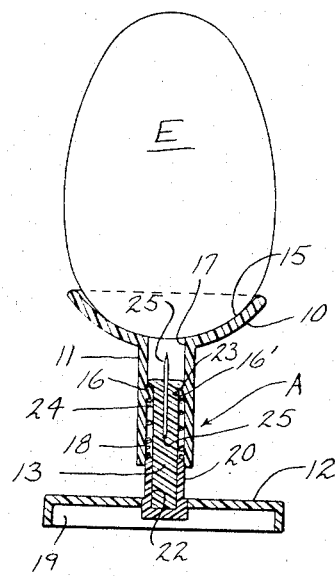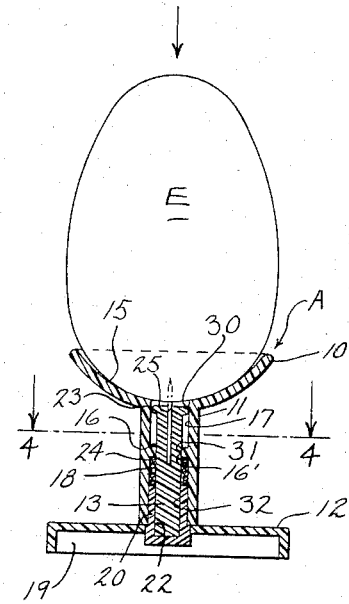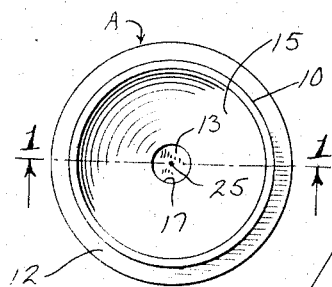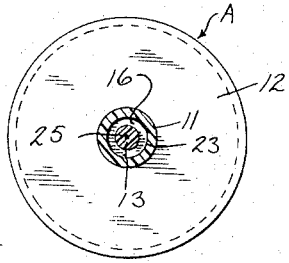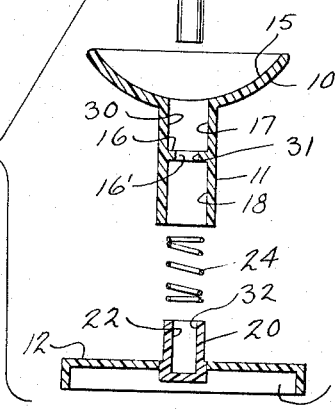
INVENTOR
AXEL MOELLER
BY
GEORGE W. WRIGHT, JR.

3,349,821
EGG VENTING DEVICE
Axel Moeller, St. Petersburg Beach, Fla., assignor to Moeller Mfg. Co., Inc., Greenville, Miss., a corporation
Filed May 2, 1966, Ser. No. 546,637
3 Claims. (Cl. 146—2)

This invention appertains to an egg venting device and more particularly to a device for forming a small air vent opening in the large end of the shell of an egg.

As is well known, in boiling eggs rapid differences in temperature, resulting from taking a refrigerated egg and subjecting it to intense heat, causes rapid expansion of the air within the shell and thus, the shell may become cracked.

When the shell is cracked the white or albumen of the egg leaks out through the shell and thus not only is wasted but causes undesirable physical characteristics and appearance making the egg less appetizing.

It is, therefore, a primary object of the present invention to provide a novel device for puncturing preferably the large end of an egg to provide a small air vent opening which while large enough to allow air to escape, is not large enough to allow the albumen or white to leak through.

A further important object of my present invention is to provide a novel device having a cup shaped egg engaging part at the axial center of which is an opening through which a small pin may project to puncture or vent the egg shell.

A specific object of the present invention is to provide an egg puncturing device of such a character that the egg shaped seating part is slidably held to a base portion in such a manner that the depending sleeve of the egg engaging part is held in a strong, steady position as it slides vertically in respect to the base.

Still another object of the present invention is to provide an egg puncturing device having a reciprocating or sliding egg engaging or seating part wherein at least three bearing surfaces are provided at all times to allow for the positive movement of the egg seating part in one position to puncture the shell of the egg seated therein.

A further object of the invention is to provide a portable egg puncturing unit of an attractive appearance and comparatively small size, and one which can be placed upon the market at a reasonable cost and will be durable and efficient in use.

A still further object of the present invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts, hereinafter more fully described, illustrated and claimed.

A preferred and practical embodiment of the invention is shown in the accompanying drawing, in which FIGURE 1 is a vertical section through the egg puncturing device shown in its "at rest" position with an egg in position for puncturing, the section being represented by the line 1—1 of FIGURE 3 looking in the direction of the arrows;

FIGURE 2 is a vertical section through the egg puncturing device but showing the same in its operative position for puncturing the egg shell;

FIGURE 3 is a top plan view of the device with the egg removed from its egg seating or engaging part;

FIGURE 4 is a transverse horizontal section taken on the line 4—4 of FIGURE 2 of the drawing, and looking in the direction of the arrows, and FIGURE 5 is an exploded view illustrating the various parts in the construction of the device and manner of assembling the same, the main parts being in section.

Referring now to the drawing in detail, wherein similar reference characters designate corresponding parts throughout the several views, the letter A generally indicates the novel egg puncturing device and the same includes broadly a cup shaped egg engaging or seating part 10 carrying a hollow depending sleeve 11, a base 12 and a pin carrying stud 13.

Attention is directed primarily to FIGURE 5 wherein various parts are clearly illustrated. Therefore it can be seen that the egg engaging or seating part 10 carrying the aforementioned depending sleeve 11 is so constructed and arranged that the depending sleeve is at the axial center of the concave, dished shaped portion 15 to provide an axial bore therethrough. Intermediate the axial bore is a projecting circular lip 16 which divides the bore into two compartments or cylinders 17 and 18, respectively. The base 12 merely includes a circular surface engaging portion 19 and has secured at its axial center an upstanding lug 20. This lug may be molded integral with the base or welded, or otherwise secured thereto. The various parts may be made of any desired material but preferably are molded from a clear, sturdy plastic and thus lug 20 is provided with an opening 22 of a size and configuration to receive the lower portion of stud 13 and stud 13 is glued or welded securely to the lug 20 in its assembled position. Aperture 16' formed by the inwardly extending lip 16 is of a size and configuration to slidably but snugly receive the body of the stud 13. The upper end of the stud 13 is molded with an enlarged peripheral integral ring 23 and the outer peripheral edge is slidably and snugly received within the cylindrical portion 17 of sleeve 11 and engages lip 16 to act as a stop to prevent the egg seating part 10 and base 12 from separating under tension of the spring 24. Spring 24 therefore, has its lower end seated on the upper end termination of lug 20 and its upper end engages the under portion of lip 16 and is tensioned to exert pressure in a direction to constantly force base 12 and egg engaging portion 10 apart. Thus, when stud 13 is securely welded or glued within the opening 22 of lug 20 with the spring 24 in place, the spring will normally urge the egg engaging or seating part 10 in the position shown in FIGURE 1 of the drawing, where the pin 25 secured at the axial center of the upper portion of stud 13 will lie just below the cup shaped surface 15 and within the opening of upper cylindrical portion 17. However, when as in FIGURE 2, pressure is exerted in the direction of the arrow on the egg E, the egg engaging and seating part 10 will move down and pin 25 will puncture the egg shell to provide a vent for the same.

It is important that the device be sturdy and that no wobbling take place between the base 12, egg engaging part 10 and depending sleeve 11 and therefore it should be noted that ring 23 snugly engages the side walls of the upper cylindrical portion 17 to provide one bearing surface, lip 16 snugly engages the body of the stud 13 to provide a second bearing surface and the lower cylindrical wall of cylinder 18 engages the corresponding part of lug 20 providing a third bearing surface. Thus, it can be seen that the egg engaging or seating part 10 is slidable in relation to base 12 and may reciprocate in relation thereto in a firm and steady manner. This is particularly apparent in FIGURE 2 of the drawing, wherein the three bearing surfaces are identified by the reference numerals 30, 31 and 32 respectively.

While I have shown and described certain specific embodiments of my invention, it will be understood that these embodiments are merely for the purpose of illustration and description, that various forms may be devised and that changes may be made in the proportion and minor details of construction without departing from the spirit of the invention or scope of the appended claims.

What is claimed as new is:

1. A device for forming a vent opening in the shell of an egg including, a rigid base, an upstanding lug integral with said base, said lug being provided with a central opening, an elongated stud having one end received in said lug opening and firmly secured to said lug, an egg puncturing pin secured at the axial center of said stud at its other end, a cup shaped egg engaging and seating part having a depending hollow sleeve at its axial center, said sleeve having an inwardly directed circular lip intermediate its ends providing an opening of a size and configuration to slidably and snugly engage said stud and to divide said sleeve into an upper and lower cylindrical portion of like inner dimensions, the lower cylindrical portion having an inner dimension adapted to slidably and snugly engage the outer surface of said lug, a peripheral ring on said lug adjacent said pin of a size and configuration to snugly and slidably engage the inner surface of said upper cylindrical portion and a spring having one end engaging said lug and its other end engaging said circular lip biased to constantly urge said egg engaging part and said base away from one another with said lip and circular ring engaging to provide a limit stop, said stud and pin being of a size and configuration to confine said pin end within said upper cylindrical portion just below the egg engaging and seating portion in its extended position but to allow said pin to enter above said egg engaging surface upon the movement of said egg engaging part downwardly against the bias of said spring.

2. A device for forming a vent opening in the shell of an egg as set forth in claim 1, wherein said base stud and egg engaging parts are circular in form and wherein said ring, said lip, said lug and said respective portions of said upper and lower cylindrical parts cooperate to provide a three point engagement at all times for slidably connecting said base and said egg engaging part.

3. A device for forming a vent opening in the shell of an egg as set forth in claim 1, wherein said parts are molded of a plastic and wherein said base and said lug are molded integral and wherein said egg engaging part, said depending sleeve and said inner circular lip are molded integral.

References Cited
UNITED STATES PATENTS 2,224,941    12/1940    Weimer _____ 146—2

W. GRAYDON ABERCROMBIE, *Primary Examiner.*